United States Patent
Beausoleil et al.

(10) Patent No.: US 10,989,878 B2
(45) Date of Patent: *Apr. 27, 2021

(54) MULTI-WAVELENGTH OPTICAL SIGNAL SPLITTING

(71) Applicant: HEWLETT PACKARD ENTERPRISE DEVELOPMENT LP, Houston, TX (US)

(72) Inventors: Raymond G. Beausoleil, Palo Alto, CA (US); Di Liang, Santa Barbara, CA (US); Marco Fiorentino, Palo Alto, CA (US); Geza Kurczveil, Palo Alto, CA (US); Mir Ashkan Seyedi, Palo Alto, CA (US); Zhihong Huang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,675

(22) Filed: May 15, 2020

(65) Prior Publication Data

US 2020/0271864 A1 Aug. 27, 2020

Related U.S. Application Data

(62) Division of application No. 15/718,306, filed on Sep. 28, 2017, now Pat. No. 10,656,337.

(51) Int. Cl.
*G02B 6/293* (2006.01)
*H04J 14/02* (2006.01)
(Continued)

(52) U.S. Cl.
CPC ....... *G02B 6/2938* (2013.01); *G02B 6/29343* (2013.01); *H04B 10/503* (2013.01);
(Continued)

(58) Field of Classification Search
None
See application file for complete search history.

(56) References Cited

U.S. PATENT DOCUMENTS 4,859,018 A 8/1989 O'Sullivan et al.
4,953,935 A * 9/1990 Suchoski, Jr. ....... G02B 6/2804
385/46

(Continued)

OTHER PUBLICATIONS

Jon Titus, "DWDM Communications Rely on basic Test Techniques", EDN, available online at <https://www.edn.com/dwdm-communications-rely-on-basic-test-techniques/>, Mar. 1, 2000, 13 pages.

(Continued)

*Primary Examiner* — David W Lambert
(74) *Attorney, Agent, or Firm* — Hewlett Packard Enterprise Patent Department

(57) ABSTRACT

An example system for multi-wavelength optical signal splitting is disclosed. The example disclosed herein comprises a first splitter, a second splitter, and a modulator. The system receives a multi-wavelength optical signal and an electrical signal, wherein the multi-wavelength optical signal comprises a plurality of optical wavelengths and has a power level. The first splitter is to split the plurality of optical wavelengths into a plurality of optical wavelength groups. The second splitter is to split the multi-wavelength optical signal or the plurality of optical wavelength groups into a plurality of lower power signal groups. The modulator is to encode the electrical signal into the plurality of optical wavelength groups, the plurality of lower power signal groups, or a combination thereof.

13 Claims, 7 Drawing Sheets

(51) Int. Cl.
*H04Q 11/00* (2006.01)
*H04B 10/50* (2013.01)
*G02B 6/12* (2006.01)

(52) U.S. Cl.
CPC ............ *H04B 10/506* (2013.01); *H04J 14/02* (2013.01); *H04J 14/0221* (2013.01); *H04J 14/0256* (2013.01); *H04Q 11/0005* (2013.01); *G02B 6/12009* (2013.01); *G02B 6/29344* (2013.01); *H04Q 2011/0015* (2013.01); *H04Q 2011/0016* (2013.01)

(56) References Cited

U.S. PATENT DOCUMENTS

| | | | |
|---|---|---|---|
| 6,236,482 | B1 | 5/2001 | Toyohara |
| 6,728,446 | B2 * | 4/2004 | Doerr .................. G02B 6/12016 385/24 |
| 7,058,097 | B2 | 6/2006 | Ahmadvand |
| 7,127,168 | B2 | 10/2006 | Kani et al. |
| 7,248,803 | B2 | 7/2007 | Kikushima |
| 7,525,461 | B1 * | 4/2009 | Uhlhorn .................... G02F 7/00 341/137 |
| 8,531,772 | B2 | 9/2013 | Chann et al. |
| 8,798,468 | B1 | 8/2014 | Sindhu |
| 10,656,337 | B2 * | 5/2020 | Beausoleil ........... H04B 10/506 |
| 2002/0126291 | A1 * | 9/2002 | Qian ....................... H04J 14/02 359/577 |
| 2004/0052449 | A1 | 3/2004 | Trutna et al. |
| 2010/0202774 | A1 | 8/2010 | Yu |
| 2011/0129231 | A1 * | 6/2011 | Fiorentino ............... G02B 6/30 398/141 |
| 2014/0093240 | A1 | 4/2014 | Mertz et al. |
| 2014/0233946 | A1 * | 8/2014 | Gerstel ................... H04L 45/62 398/45 |
| 2016/0047985 | A1 * | 2/2016 | Docter ............... G02B 6/12019 398/79 |

OTHER PUBLICATIONS

Search Report and Written Opinion received for PCT Application No. PCT/US2018/053648, dated Jan. 16, 2019, 8 pages.

Meng et al., "Scalable Optical Access Network Design using Variable Optical Splitters", Research Gate, Sep. 2003, 5 pages.

* cited by examiner

MULTI-WAVELENGTH OPTICAL SIGNAL SPLITTING

CROSS-REFERENCE TO RELATED APPLICATIONS

This application is a continuation application of and claims priority to application Ser No. 15/718,306, filed on Sep. 28, 2017, the contents of which is hereby incorporated by reference in its entirety.

BACKGROUND

Multi-wavelength optical networking (MONET), is a method for communicating digital information using lasers over optical fiber. MONET networks provide great bandwidth capacity. Multi-wavelength optical networking employs Wave Division Multiplexing (WDM) technology for transporting large amounts of data traffic and allows for interoperability between equipment from different vendors.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
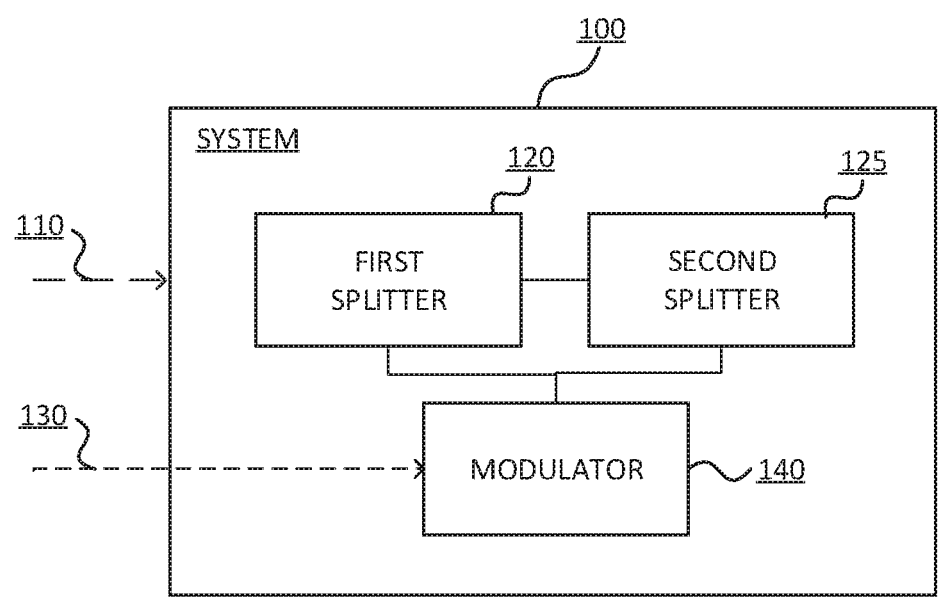
FIG. 1 is a block diagram illustrating an example of a system to split a multi-wavelength optical signal.

The following description is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to indicate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Multi-wavelength optical networking (MONET), is a method for communicating digital information using lasers over optical fiber. Its networks provide great bandwidth capacity. Multi-wavelength optical networking employs Wave Division Multiplexing (WDM) technology for transporting large amounts of data traffic and allows for interoperability between equipment from different vendors.

A WDM communication system starts from multi-wavelength sources (e.g., comb lasers, single wavelength laser array). An individual wavelength is fed to the external modulators to code the electrical information into the optical signals before they continue propagating to the receiver. The communication bandwidth of the WDM communication system can be expanded by reducing the wavelength spacing (allocating more wavelengths in a limited optical communication window). However, by reducing the wavelength spacing, cross-talk between neighboring channels may occur. Accurate control to the source, modulator, and demultiplexers in the receiver, may be required to reduce cross-talk, but it comes with more complicated photonic and driver circuit designs and higher power consumption.

Previous MONET systems may use resources inefficiently. As an example, a system may have a comb laser with 64 simultaneously operational laser lines. However, the system may be connected with a node that only needs 8 wavelengths. Therefore, there may be waste of 56 wavelengths. As another example, the previously described system may have a comb laser with 64 simultaneously operational laser lines, each of them with 1 mW of power. However, the system may be connected to a node that only needs a fraction of that power. Therefore, there may be also be a waste of power.

One example of the present disclosure provides a system for multi-wavelength optical signal splitting. The example comprises a first splitter, a second splitter, and a modulator. The system receives a multi-wavelength optical signal and an electrical signal, wherein the multi-wavelength optical signal comprises a plurality of optical wavelengths and has a power level. The first splitter is to split the plurality of optical wavelengths into a plurality of optical wavelength groups. The second splitter is to split the multi-wavelength optical signal or the plurality of optical wavelength groups into a plurality of lower power signal groups. The modulator is to encode the electrical signal into the plurality of optical wavelength groups, the plurality of lower power signal groups, or a combination thereof.

Another example of the present disclosure provides a method for multi-wavelength optical signal splitting. The method comprises the steps of receiving a multi-wavelength optical signal, wherein the multi-wavelength optical signal comprises a plurality of optical wavelengths and has a power level; and receiving an electrical signal. The method also comprises the step of splitting the plurality of optical wavelengths into a plurality of optical wavelength groups; and splitting the multi-wavelength optical signal or the plurality of optical wavelength groups into a plurality of lower power signal groups. The method further comprises the step of encoding the electrical signal into the plurality of optical wavelength groups, the plurality of lower power signal groups or a combination thereof.

The examples from the present disclosure, provides a system and a method that split the multi-wavelengths and the power within them. Therefore, having the technical advantage of (1) allowing to separate and use only the wavelengths that the connected node need and then sending the not used wavelengths someplace else where they can be used differently; and (2) allowing to split the power within the wavelengths (e.g., from one stream of 64 wavelengths of 1 mW each, to two streams of 64 wavelengths of 0.5 mW each) and sending the unused wavelengths (and its power) someplace else where they can be used differently. Therefore, the examples from the present disclosure provide a more efficient use of all the power and wavelength resources that are available in the transmitter.

FIG. 1 is a block diagram illustrating an example of a system to split a multi-wavelength optical signal. The system 100 comprises a first splitter 120, a second splitter 125, and a modulator 140. The first splitter 120 and the second splitter 125 may have a bidirectional coupling. The first splitter 120 is coupled to the modulator 140. The second splitter 125 is also coupled to the modulator. The system 100 receives a multi-wavelength optical signal 100 that is inputted to the first splitter 120, the second splitter 125, or a combination thereof. The multi-wavelength optical signal 110 comprises a plurality of optical wavelengths and has a power level. The system 100 also receives an electrical signal 130 that is inputted to the modulator 140.

System 100 may be implemented in multiple ways. As a first example, system 100 may be implemented as part of the data transmitting mechanism between the transmitter side of a first networking switch, and the receiver side of a second networking switch, therefore allowing communication between said first networking switch and second networking switch. In a second example, system 100 may be implemented as being part of the data transmitting mechanism between a processing unit (e.g., central processing unit (CPU), system on a chip (SoC)), and a memory unit (e.g., Dynamic Random Access Memory (DRAM)), therefore allowing communication between said processing unit and memory unit.

The first splitter 120 is to split the plurality of optical wavelengths from the multi-wavelength optical signal 110 into a plurality of optical wavelength groups, wherein the plurality of optical wavelength groups are fewer than the plurality of optical wavelengths. In a first example, the multi-wavelength optical signal 110 may comprise four optical wavelengths (λ1, λ2, λ3, λ4) that input in the first splitter 120, then the first splitter 120 splits the four optical wavelengths into two optical wavelength groups, a first optical wavelength group (λ1, λ3), and a second optical wavelength group (λ2, λ4). In a second example, the multi-wavelength optical signal 110 may comprise four optical wavelengths (λ1, λ2, λ3, λ4) that are input in the first splitter 120, then the first splitter 120 splits the four optical wavelengths into three optical wavelength groups, a first optical wavelength group (λ1, λ4), a second optical wavelength group (λ2), and a third optical wavelength group (λ3). In another example, the first splitter may split the plurality of optical wavelengths into a plurality of optical wavelength groups by increasing the channel space between any consecutive optical wavelengths in an optical wavelength group (see, e.g., implementation 200A from 2A). There are a plurality of implementations of the first splitter 120, FIG. 2A, and FIG. 3 disclose some examples of the first splitter 120. The first splitter 120 may comprise a single splitter or a plurality of splitters connected in cascade (see, e.g., FIG. 2B). The first splitter 120 may be connected after the second splitter 125 (see, e.g., FIG. 4D and FIG. 4E).

The second splitter 125 is to split the multi-wavelength optical signal 110 or the plurality of optical wavelength groups into a plurality of lower power signal groups, each of the lower power signal groups having a lower power level than the power level of the multi-wavelength optical signals. In a first example, the multi-wavelength optical signal 110 may comprise four optical wavelengths with power level (1 mW λ1, 1 mW λ2, 1 mW λ3, 1 mW λ4) that are input to the second splitter 125, then the second splitter 125 splits the four optical wavelengths into two lower power signal groups, a first lower power signal group (0.5 mW λ1, 0.5 mW λ2, 0.5 mW λ3, 0.5 mW λ4), and a second optical wavelength group (0.5 mW λ1, 0.5 mW λ2, 0.5 mW λ3, 0.5 mW λ4). In a second example, the multi-wavelength optical signal 110 may comprise four optical wavelengths with power level (1 mW λ1, 1 mW λ2, 1 mW λ3, 1 mW λ4) that input in the second splitter 125, then the second splitter 125 splits the four optical wavelengths into two lower power signal groups, a first lower power signal group (0.75 mW λ1, 0.75 mW λ2, 0.75 mW λ3, 0.75 mW λ4), and a second optical wavelength group (0.25 mW λ1, 0.25 mW λ2, 0.25 mW λ3, 0.25 mW λ4). In a third example, the multi-wavelength optical signal 110 may comprise four optical wavelengths with power level (1 mW λ1, 1 mW λ2, 1 mW λ3, 1 mW λ4) that input in the second splitter 125, then the second splitter 125 splits the four optical wavelengths into three lower power signal groups, a first lower power signal group (0.33 mW λ1, 0.33 mW λ2, 0.33 mW λ3, 0.33 mW λ4), a second optical wavelength group (0.33 mW λ1, 0.33 mW λ2, 0.33 mW λ3, 0.33 mW λ4), and a third optical wavelength group (0.33 mW λ1, 0.33 mW λ2, 0.33 mW λ3, 0.33 mW λ4). There are a plurality of implementations of the second splitter 125, FIG. 4A, FIG. 4B, and FIG. 4C disclose some examples of the first splitter 120. The second splitter 125 may comprise a single splitter or a plurality of splitters connected in cascade. The second splitter 125 may be connected after the first splitter 120 (see, e.g., FIG. 4F and FIG. 4G).

The modulator 140 is to encode the electrical signal into the plurality of optical wavelength groups, the plurality of lower power signal groups, or a combination thereof.

Figure 2A:
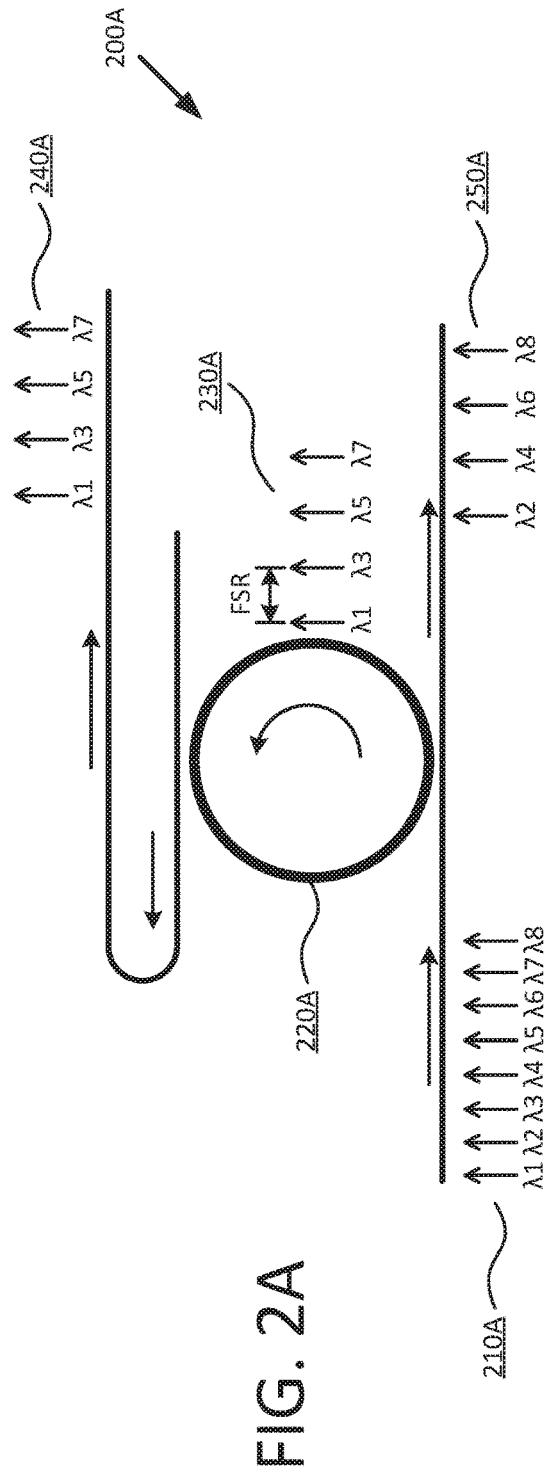
FIG. 2A is a block diagram illustrating an example of a ring resonator-based wavelength splitter.

FIG. 2A is a block diagram illustrating an example of a ring resonator-based wavelength splitter. The ring resonator-based wavelength splitter 200A may be implemented as the first splitter 120 from FIG. 1. The ring resonator-based wavelength splitter 200A comprises a ring 220A wherein light can propagate therein based on the refraction index of the ring 220A. The refraction index of the ring 220A is directly related to the circumference size of the ring 220A. The refraction index may be tunable under certain conditions, some examples of said conditions are the temperature, and injecting electric current. These conditions make the ring 220A to propagate the incoming wavelengths of a specific integer wavelength number. For example, the ring resonator-based wavelength splitter 200A receives a multi-wavelength optical signal 210A with eight optical wavelengths (λ1, λ2, λ3, λ4, λ5, λ6, λ7, λ8) that input into the ring 220A. The multi-wavelength optical signal 210A may be the same or similar as the multi-wavelength optical signal 110 from FIG. 1. The ring 220A has a ring circumference with a refraction index that makes that only even number wavelengths to be propagated into the resonator, since the ring 220A propagates the consecutive wavelengths that have a Free Spectral Range (FSR) of two wavelength units. In the present disclosure, the FSR may be understood as the distance between two consecutive wavelengths propagated in a ring resonator. Therefore, the optical wavelengths 230A (λ1, λ3, λ5, λ7) propagate into the ring, whereas the optical wavelengths (λ2, λ4, λ6, λ8) are not propagated. The propagated optical wavelengths 230A (λ1, λ3, λ5, λ7) may output the ring resonator-based wavelength splitter 200A through a first channel 240A, whereas the non-propagated optical wavelengths (λ2, λ4, λ6, λ8) may output the ring-resonator based wavelength splitter 200A through a second channel 250A. Therefore, the ring resonator-based splitter 200A split the multi-wavelength optical signal 210A with eight optical wavelengths into two optical wavelength groups, the first optical wavelength group though the first channel 240A, and the second optical wavelength group through the second channel 250A.

Figure 2B:
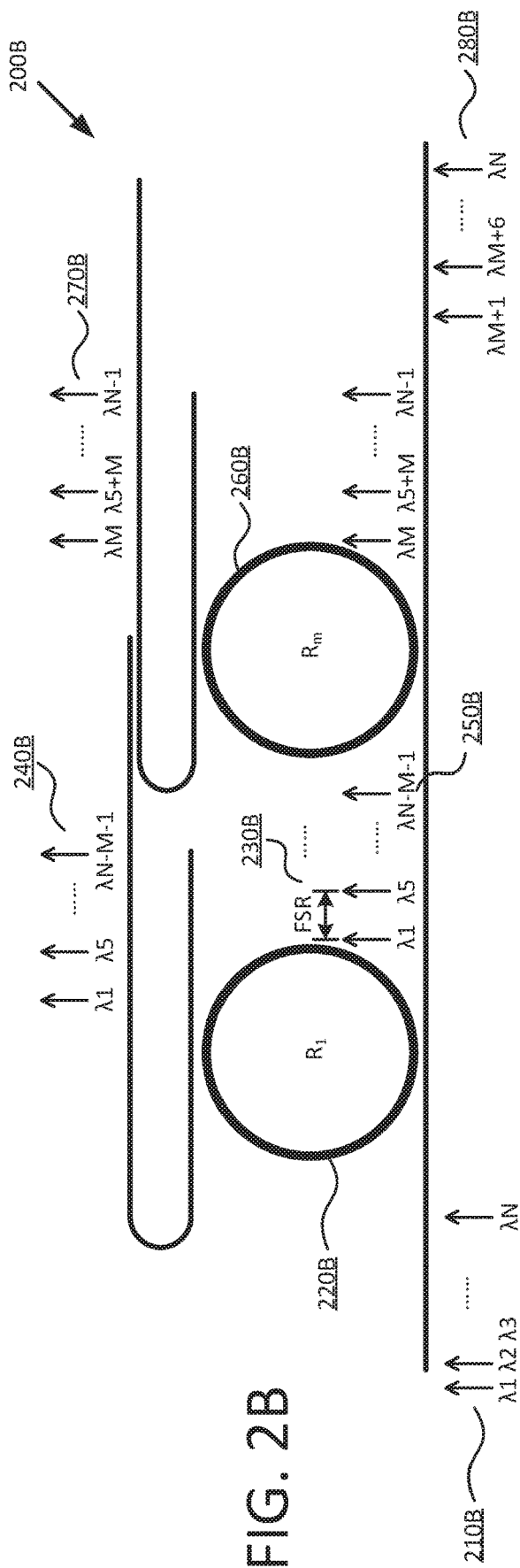
FIG. 2B is a block diagram illustrating an example of a plurality of ring resonator-based wavelength splitters connected in cascade.

FIG. 2B is a block diagram illustrating an example of a plurality of ring resonator-based wavelength splitters connected in cascade. The splitter 200B comprises a first ring resonator-based splitter 220B and a second ring resonator-based splitter 260B connected in cascade. The first ring resonator-based splitter 220B and a second ring resonator-based splitter 260B may be the same or similar as the ring resonator-based splitter 220A from FIG. 2A. For clarity purposes, both splitters are from the same type (ring resonator-based splitters), however and with no aim of restricting the scope of the present disclosure, different types of splitters may be connected in cascade. In the example, the first ring resonator-based splitter 220B propagates wavelengths with a FSR of 5 wavelength units, and the second ring resonator-based splitter 260B propagates wavelengths with a FSR of M wavelength units, wherein M is a positive integer. In the example, the splitter 200B receives a multi-wavelength optical signal 210B with N optical wavelengths (λ1, λ2, λ3, λ4, . . . λN) that input into the ring 220B, wherein N is a positive integer. The multi-wavelength optical signal 210A may be the same or similar as the multi-wavelength optical signal 110 from FIG. 1. Then, as the ring 220B has a FSR of 5 wavelength units, the ring 220B propagates a first optical wavelength group 230B (λ1, λ5, λ10, . . . , λN−M−1). The first optical wavelength group 230B (λ1, λ5, λ10, . . . , λN−M−1) is outputted through the first output channel 240B. Since the ring 220B is connected to the ring 260B in cascade, the non-propagated optical wavelengths from ring 220B are inputted into the ring 260B. Then, as the ring 260B has a FSR of M wavelength units, the ring 260B propagates a second optical wavelength group (λM, λ5+M, λ10+M, . . . , λN−1). The second optical wavelength group (λM, λ5+M, λ10+M, . . . , λN−1) is outputted through the second output channel 270B. The non-propagated optical wavelengths from ring 260B form the third optical wavelength group (λM+1, λM+6, . . . , λN) which is outputted though the third output channel 280B. Therefore, the splitter 200A, comprising two ring resonator-based splitters connected in cascade, split the multi-wavelength optical signal 210B into three optical wavelength groups, the first optical wavelength group though the first channel 240B, the second optical wavelength group through the second channel 270B, and the third optical wavelength group through the third channel 280B. For simplicity, the example only comprised two ring resonator-based splitters connected in cascade, however more ring resonator-based splitters may be connected in cascade.

Figure 3:
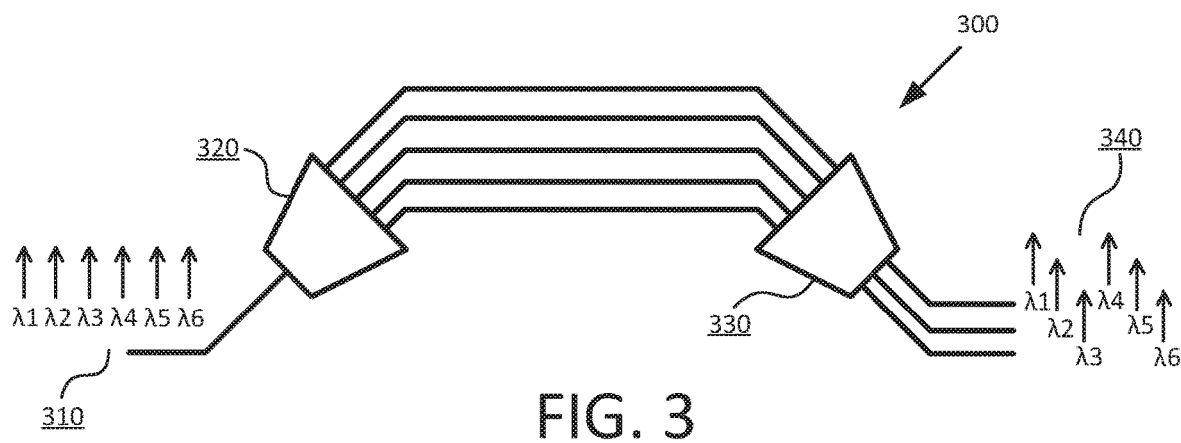
FIG. 3 is a block diagram illustrating an example of an array waveguide grating (AWG) splitter.

FIG. 3 is a block diagram illustrating an example of an array waveguide grating (AWG) splitter. The AWG splitter 300 may be implemented as the first splitter 120 from FIG. 1. The AWG 300 comprise a first free propagation region 320 and a second free propagation region 330. The first free propagation region 320 may perform diffraction from a multi-wavelength optical signal (e.g., multi-wavelength optical signal 110 from FIG. 1) to a plurality of diffraction wave guides. Then, the plurality of diffraction wave guides may input the second free propagation waveguide 330 to split the plurality of wavelengths within the diffraction wave guides into the plurality of output channels. In the example, the AWG 300 receives a multi-wavelength optical signal 310 with six optical wavelengths (λ1, λ2, λ3, λ4, λ5, λ6) that input into the free propagation region 320. Then, the six optical wavelengths are propagated to the second free propagation waveguide 330 where they are split into three output channels 340. According to the drawings and written in sequential order, the first optical wavelength (λ1) may output though the first output channel; the second optical wavelength (λ2) may output though the second output channel; the third optical wavelength (λ3) may output though the third output channel; the fourth optical wavelength (λ4) may output though the first output channel; the fifth optical wavelength (λ5) may output though the second output channel; and the sixth optical wavelength (λ6) may output though the third output channel. Therefore, the AWG 300 split the multi-wavelength optical signal 310 with sis optical wavelengths (λ1-λ6) into three optical wavelength groups, the first optical wavelength group (λ1, λ4) though the first channel, the second optical wavelength group (λ2, λ5) through the second channel, and the third optical wavelength group (λ3, λ6) through the third channel. For simplicity, the AWG 300 only comprised five diffraction wave guides and three output channels, however it may designed with a different number of diffraction wave guides and a different number of output channels. AWG splitters may be connected in cascade with any other wavelength splitter or power splitter (see, e.g., FIG. 2B).

Figure 4A:
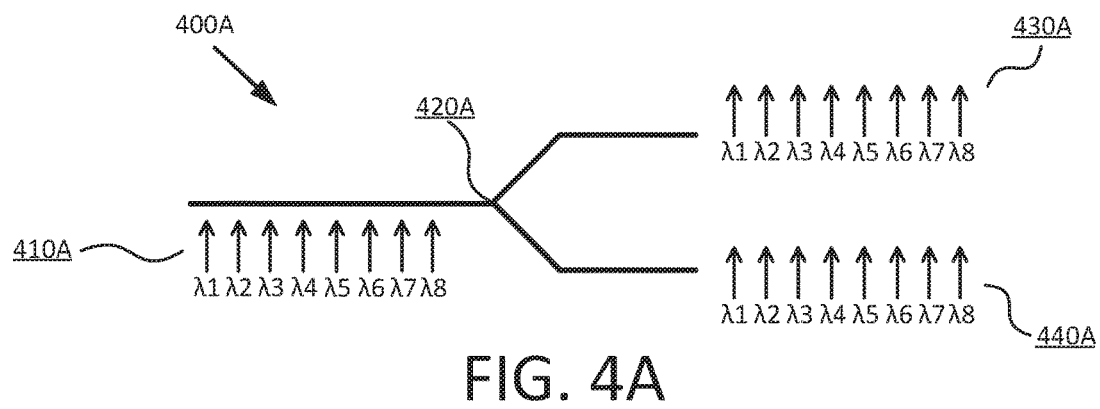
FIG. 4A is a block diagram illustrating an example of a Y branch splitter.

FIG. 4A is a block diagram illustrating an example of a Y branch splitter. The Y branch splitter 400A may be implemented as the second splitter 125 from FIG. 1. The Y branch splitter 400A is to split an incoming multi-wavelength optical signal (e.g., multi-wavelength optical signal 110 from FIG. 1) into a plurality of lower power signal groups, wherein the plurality of lower power signal groups have the same power level. In the example, the Y branch splitter 400A receives a multi-wavelength optical signal 410A with eight optical wavelengths of 1 mW each (1 mW λ1, 1 mW λ2, 1 mW λ3, 1 mW λ4, 1 mW λ5, 1 mW λ6, 1 mW λ7, 1 mW λ8). The eight optical wavelengths propagates through the single waveguide, up to the waveguide breaking point 420A wherein the single waveguide (left side of the waveguide breaking point 420A) splits into two waveguides or output channels 430A-440A (right side of the waveguide breaking point 420A). Then, the waveguides split in half therefore outputting (0.5 mW λ1, 0.5 mW λ2, 0.5 mW λ3, 0.5 mW λ4, 0.5 mW λ5, 0.5 mW λ6, 0.5 mW λ7, 0.5 mW λ8) through the first output channel 430A and outputting (0.5 mW λ1, 0.5 mW λ2, 0.5 mW λ3, 0.5 mW λ4, 0.5 mW λ5, 0.5 mW λ6, 0.5 mW λ7, 0.5 mW λ8) through the second output channel 440A. Y branch splitters may be connected in cascade with any other power splitter or wavelength splitter (see, e.g., FIG. 2B).

Figure 4B:
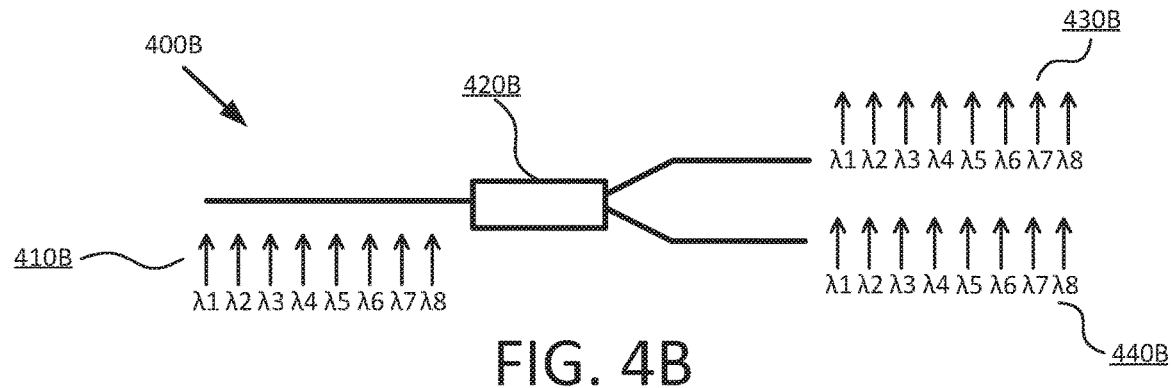
FIG. 4B is a block diagram illustrating an example of a multi-mode interferometer (MMI) splitter.

FIG. 4B is a block diagram illustrating an example of a multi-mode interferometer (MMI) splitter. The MMI splitter 400B may be implemented as the second splitter 125 from FIG. 1. The MMI splitter 400B is to split an incoming multi-wavelength optical signal (e.g., multi-wavelength optical signal 110 from FIG. 1) into a plurality of lower power signal groups, wherein the plurality of lower power signal groups have the same or different power levels. In the example, the MMI splitter 400B receives a multi-wavelength optical signal 410B with eight optical wavelengths of 1 mW each (1 mW λ1, 1 mW λ2, 1 mW λ3, 1 mW λ4, 1 mW λ5, 1 mW λ6, 1 mW λ7, 1 mW λ8). The eight optical wavelengths propagates through the single waveguide, up to the waveguide breaking point 420B wherein the single waveguide (left side of the waveguide breaking point 420B) splits into two waveguides or output channels 430B-440B (right side of the waveguide breaking point 420B). Then, the waveguides split therefore outputting, for example, (0.8 mW λ1, 0.8 mW λ2, 0.8 mW λ3, 0.8 mW λ4, 0.8 mW λ5, 0.8 mW λ6, 0.8 mW λ7, 0.8 mW λ8) through the first output channel 430B and outputting (0.2 mW λ1, 0.2 mW λ2, 0.2 mW λ3, 0.2 mW λ4, 0.2 mW λ5, 0.2 mW λ6, 0.2 mW λ7, 0.2 mW λ8) through the second output channel 440B. For simplicity, only two output ports were shown, however the MMI splitter 420B can have more output ports being able to adjust the power level of each output port. MMI splitters may be connected in cascade with any other power splitter or wavelength splitter (see, e.g., FIG. 2B).

Figure 4C:
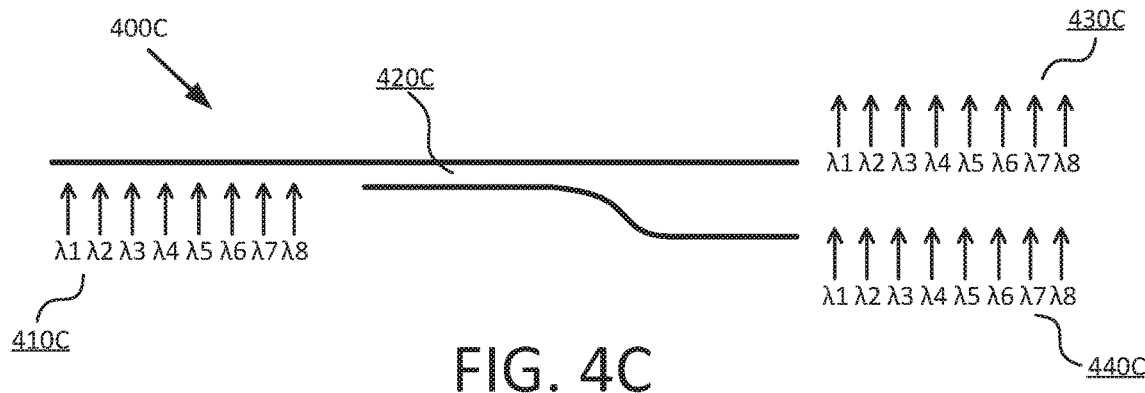
FIG. 4C is a block diagram illustrating an example of a directional coupler splitter.

FIG. 4C is a block diagram illustrating an example of a directional coupler splitter. The MMI splitter 400C may be implemented as the second splitter 125 from FIG. 1. The MMI splitter 400C is to split an incoming multi-wavelength optical signal (e.g., multi-wavelength optical signal 110 from FIG. 1) into a plurality of lower power signal groups, wherein the plurality of lower power signal groups have the same or different power levels. The directional coupler 400C may have a main wave guide (top of FIG. 4C) and a neighbor wave guide (bottom of FIG. 4C). The wavelengths are propagated through the main wave guide, however if the neighbor waveguide is close enough to the main wave guide, some power from the main wave guide may be transferred (split) to the neighbor waveguide. Therefore, (1) how close the neighbor wave guide is to the main wave guide, and (2) how long the neighbor waveguide is that close to the main wave guide, are parameters that may determine how much power may be transferred (split) from the main wave guide to the neighbor waveguide. In the example, the directional coupler splitter 400C receives a multi-wavelength optical signal 410C with eight optical wavelengths of 1 mW each (1 mW λ1, 1 mW λ2, 1 mW λ3, 1 mW λ4, 1 mW λ5, 1 mW λ6, 1 mW λ7, 1 mW λ8). The eight optical wavelengths propagate through the main wave guide, up to the wave guide breaking point 420C wherein the neighbor waveguide approaches the main waveguide and splits the eight optical wavelengths power into two channels 430C-440C. Then, the eight optical wavelengths power may split, for example, (0.75 mW λ1, 0.75 mW λ2, 0.75 mW λ3, 0.75 mW λ4, 0.75 mW λ5, 0.75 mW λ6, 0.75 mW λ7, 0.75 mW λ8) through the main output channel 430C and outputting (0.25 mW λ1, 0.25 mW λ2, 0.25 mW λ3, 0.25 mW λ4, 0.25 mW λ5, 0.25 mW λ6, 0.25 mW λ7, 0.25 mW λ8) through the neighbor output channel 440C. Directional coupler splitters may be connected in cascade with any other power splitter or wavelength splitter (see, e.g., FIG. 2B).

Figure 4D:
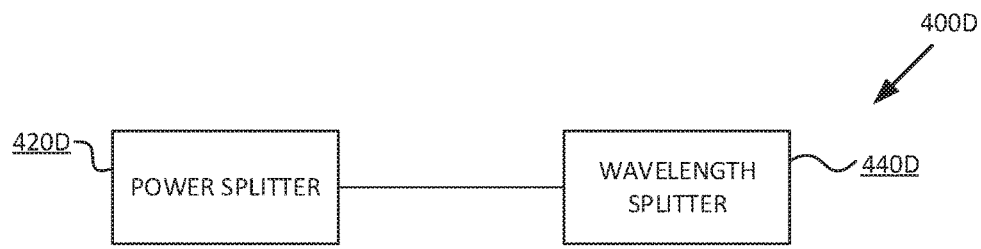
FIG. 4D is a block diagram illustrating an example of a power splitter coupled to a wavelength splitter.

FIG. 4D is a block diagram illustrating an example of a power splitter coupled to a wavelength splitter. The system 400D may be implemented as the first splitter 120 and second splitter 125 from FIG. 1. System 400D comprises a power splitter 420D connected to a wavelength splitter 440D. The power splitter 420D may split a plurality of optical wavelengths from a multi-wavelength optical signal (e.g., multi-wavelength optical signal 110 from FIG. 1) into a plurality of lower power optical wavelengths. The functionality of the power splitter 420D may be the same or similar as the Y branch splitter 400A from FIG. 4A, the MMU splitter 400B from FIG. 4B, the directional coupler 400C from FIG. 4C, or a combination thereof connected in cascade. The multi-wavelength splitter 440D may split the plurality of lower power optical wavelengths outputted from the power splitter 420D, into a plurality of lower power optical wavelengths groups. The functionality of the multi-wavelength splitter 440D may be the same or similar as the ring resonator-based wavelength splitter 200A from FIG. 2A, the AWG 300 from FIG. 3, or a combination thereof connected in cascade (e.g., splitter 200B from FIG. 2B). For clarity purposes, FIG. 4E shows an example of the system 400D.

Figure 4E:
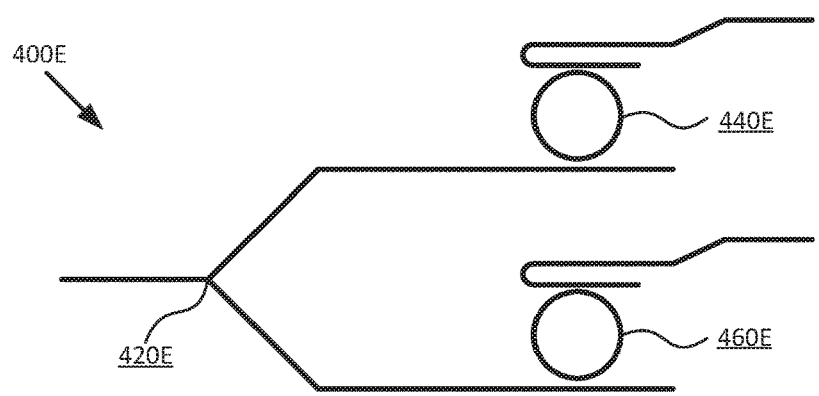
FIG. 4E is a block diagram illustrating another example of a power splitter coupled to a wavelength splitter.

FIG. 4E is a block diagram illustrating another example of a power splitter coupled to a wavelength splitter. The system 400E may be implemented as the first splitter 120 and the second splitter 125 from FIG. 1. The system 400E may also be implemented as the system 400D from FIG. 4D. The system 400E comprises a Y branch power splitter 420E connecting each of the Y branch power splitter output channels to a ring resonator-based wavelength splitter (a first ring resonator-based wavelength splitter 440E to the first output channel, and a second ring resonator-based wavelength splitter 460E to the second output channel).

In an example, the system 400E may receive a multi-wavelength optical signal (e.g., multi-wavelength optical signal 110 from FIG. 1) comprising four optical wavelengths (1 mW λ1, 1 mW λ2, 1 mW λ3, 1 mW λ4) through the input channel of the Y branch splitter 420E. Then the Y branch splitter may split the power of the four optical wavelengths into the two output channels (for a more detailed disclosure of Y branch splitter 420E, see e.g., FIG. 4A); therefore outputting a first lower power wavelength group (0.5 mW λ1, 0.5 mW λ2, 0.5 mW λ3, 0.5 mW λ4) through the first output channel of the Y branch splitter 420E, and outputting a second lower power wavelength group (0.5 mW λ1, 0.5 mW λ2, 0.5 mW λ3, 0.5 mW λ4) through the second output channel of the Y branch splitter 420E. The first lower power wavelength group inputs the first ring resonator-based wavelength splitter 440E and the second lower power wavelength group inputs the second ring resonator-based wavelength splitter 460E. The first ring resonator-based wavelength splitter 440E splits the first lower power wavelength group into two lower power split wavelength groups (for a more detailed disclosure of the ring resonator-based wavelength splitter 440E, see e.g., FIG. 2A); a first lower power split wavelength group (0.5 mW λ1, 0.5 mW λ3) through the first output channel of the ring resonator-based wavelength splitter 440E, and a second lower power split wavelength group (0.5 mW λ2, 0.5 mW λ4) through the second output channel of the ring resonator-based wavelength splitter 440E. The second ring resonator-based wavelength splitter 460E splits the second lower power wavelength group into two lower power split wavelength groups; a third lower power split wavelength group (0.5 mW λ1, 0.5 mW λ3) through the first output channel of the ring resonator-based wavelength splitter 460E, and a fourth lower power split wavelength group (0.5 mW λ2, 0.5 mW λ4) through the second output channel of the ring resonator-based wavelength splitter 460E.

Figure 4F:
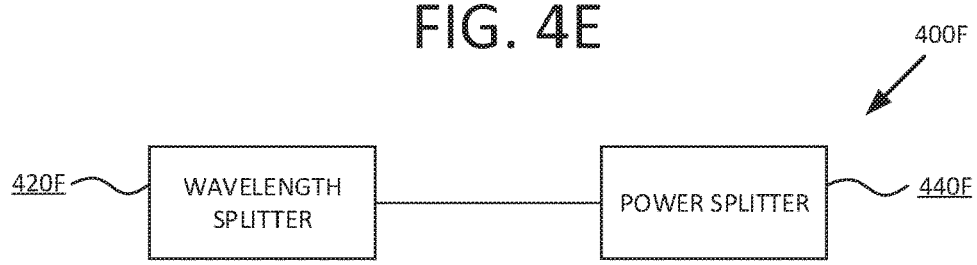
FIG. 4F is a block diagram illustrating an example of a wavelength splitter connected to a power splitter.

FIG. 4F is a block diagram illustrating an example of a wavelength splitter connected to a power splitter. The system 400F may be implemented as the first splitter 120 and the second splitter 125 from FIG. 1. System 400F comprises wavelength splitter 420F connected to a power splitter 440F. The multi-wavelength splitter 420F may split a multi-wavelength optical signal (e.g., multi-wavelength optical signal 110 from FIG. 1), into a plurality of optical wavelengths groups. The functionality of the multi-wavelength splitter 420F may be the same or similar as the ring resonator-based wavelength splitter 200A from FIG. 2A, the AWG 300 from FIG. 3, or a combination thereof connected in cascade (e.g., splitter 200B from FIG. 2B). The power splitter 440F may split the plurality of optical wavelengths groups outputted from the wavelength splitter 440F into a plurality of lower power signal groups. The functionality of the power splitter 440F may be the same or similar as the Y branch splitter 400A from FIG. 4A, the MMU splitter 400B from FIG. 4B, the directional coupler 400C from FIG. 4C, or a combination thereof connected in cascade. For clarity purposes, FIG. 4G shows an example of the system 400D.

Figure 4G:
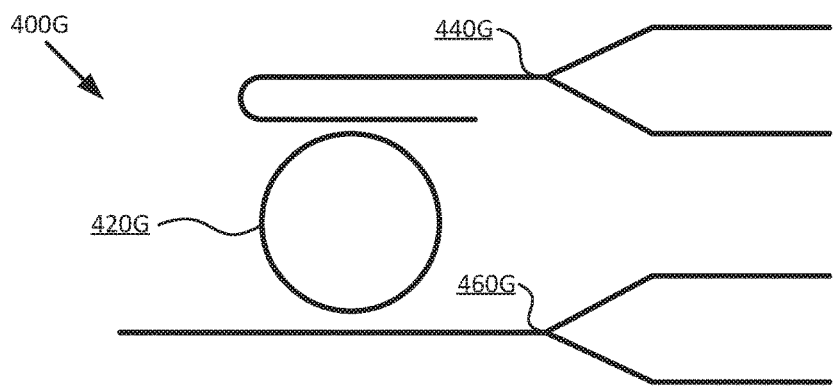
FIG. 4G is a block diagram illustrating another example of a wavelength splitter connected to a power splitter.

FIG. 4G is a block diagram illustrating another example of a wavelength splitter connected to a power splitter. The system 400G may be implemented as the first splitter 120 and the second splitter 125 from FIG. 1. The system 400G may also be implemented as the system 400F from FIG. 4F. The system 400G comprises a ring resonator-based wavelength splitter 420G connecting each of the ring resonator-based wavelength splitter 420G output channels to a Y branch splitter (a first Y branch splitter 440G to the first output channel, and a second Y branch splitter 440G to the second output channel).

In an example, the system 400G may receive a multi-wavelength optical signal (e.g., multi-wavelength optical signal 110 from FIG. 1) comprising four optical wavelengths (1 mW λ1, 1 mW λ2, 1 mW λ3, 1 mW λ4) through the input channel of the ring resonator-based wavelength splitter 420G. Then the ring resonator-based wavelength splitter 420G may split the four optical wavelengths into the two output channels (for a more detailed disclosure of the ring resonator-based splitter 420G, see e.g., FIG. 2A); therefore outputting a first optical wavelength group (1 mW λ1, 1 mW λ3) through the first output channel of the ring resonator-based wavelength splitter 420G, and outputting a second optical wavelength group (1 mW λ2, 1 mW λ4) through the second output channel of the ring resonator-based splitter 420G. The first optical wavelength group inputs the first Y branch splitter 440G and the second optical wavelength group inputs the second Y branch splitter 460G. The first Y branch splitter 440G splits the first optical wavelength group into two lower power split wavelength groups (for a more detailed disclosure of the Y branch splitter 440G, see e.g., FIG. 4A); a first lower power split wavelength group (0.5 mW λ1, 0.5 mW λ3) through the first output channel of the Y branch splitter 440G, and a second lower power split wavelength group (0.5 mW λ2, 0.5 mW λ4) through the second output channel of the Y branch splitter 440E. The second Y branch splitter 460E splits the second optical wavelength group into two lower power split wavelength groups; a third lower power split wavelength group (0.5 mW λ1, 0.5 mW λ3) through the first output channel of the Y branch splitter 460E, and a fourth lower power split wavelength group (0.5 mW λ2, 0.5 mW λ4) through the second output channel of the Y branch splitter 460E.

Figure 5:
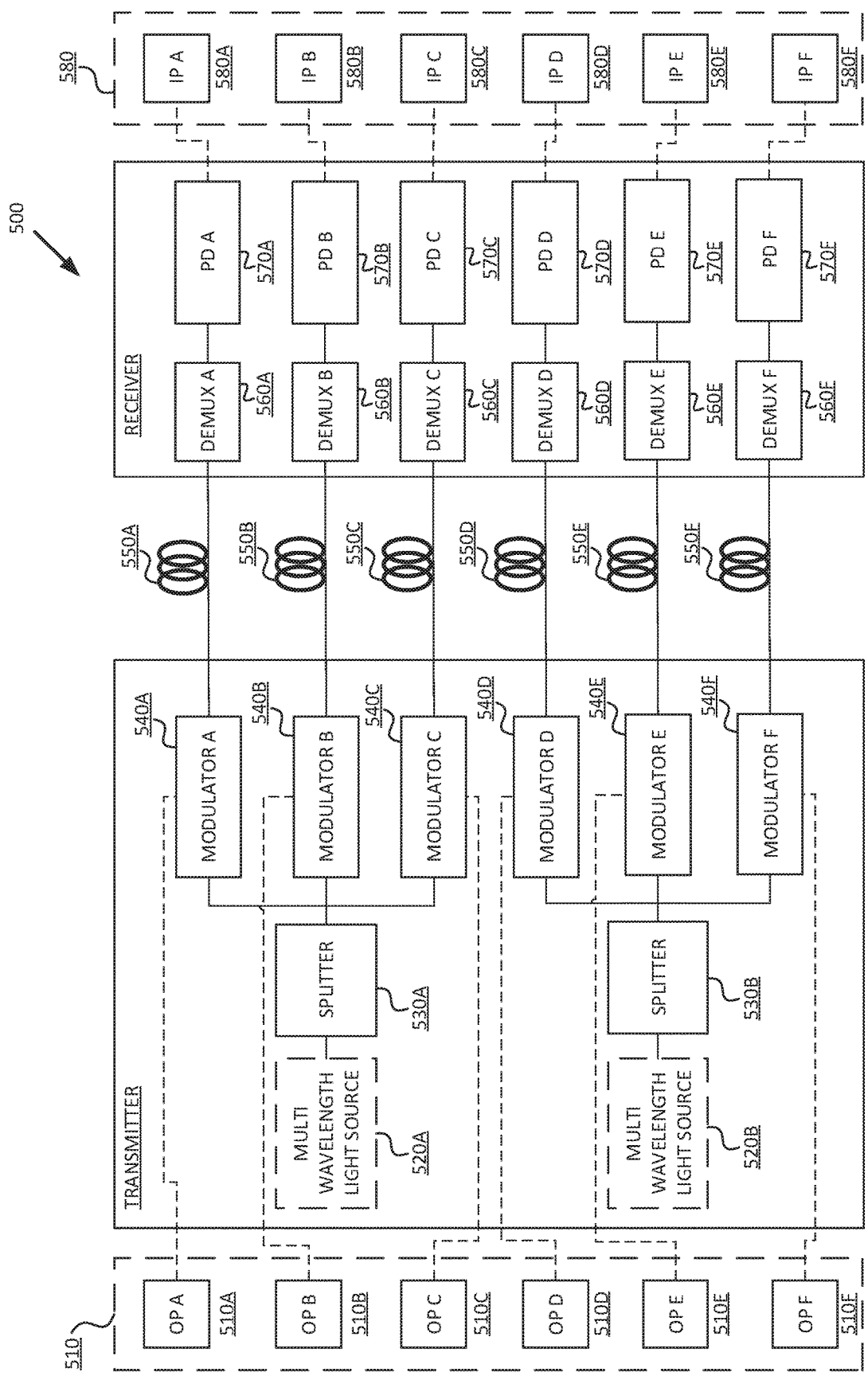
FIG. 5 is a block diagram illustrating a system to split a multi-wavelength optical signal.

FIG. 5 is a block diagram illustrating a system to split a multi-wavelength optical signal. The system 500 comprises a plurality of output ports 510 that output at least one electric signal. The plurality of output ports 510 may comprise a first output port 510A, a second output port 510, up to a sixth output port 510F. For clarity purposes, only six output ports have been shown, however any other number of output ports may be used. The system 500 may also comprise a transmitter and a receiver. The transmitter may comprise a first multi-wavelength light source 520A, and a second multi-wavelength light source 520B. A multi-wavelength light source may be understood as one or more devices that output a multi-wavelength optical signal (e.g., a comb laser, array of hybrid micro-ring lasers). Each multi wavelength light source may be connected to an splitter (e.g., multi wavelength light source 520A may be connected to the splitter 530A, multi wavelength light source 520B may be connected to the splitter 530B). Each splitter may be connected to one or more modulators (e.g., splitter 530A is connected to modulators 540A, 540B, and 540C). For clarity purposes, the drawings shows each splitter connected to three modulators, however any other number of modulators may be connected to the splitter. Each modulator is connected to a light propagation medium (e.g., optic fiber), being able to transfer optical signals to the receiver. In the drawing, each modulator is connected a different light propagation medium (e.g., modulator A 540A is connected to the light propagation medium 550A), however a different number of modulators may be connected to the same light propagation medium. If a received wavelength group comprises a plurality of optical wavelengths, the receiver comprises a demultiplexer (DEMUX). If the receiver comprises a DEMUX (e.g., DEMUX 560A-560F) it is connected to a photodetector (e.g, photodetector 570A-570F). However if the receiver does not contain a photodetector, then the light propagation medium may be connected directly to the photodetector. Each photodetector is connected to a plurality of input ports (e.g., plurality of input ports 580).

In the example, the multi wavelength light sources 520A and 520B input a multi-wavelength optical signal to the splitters 530A and 530B. The multi-wavelength optical signal comprises a plurality of optical wavelength and has a power level. The splitters 530A and 530B may be the same or similar as the first splitter 120 and second splitter 125 from FIG. 1. The splitters 530A and 530B split the plurality of optical wavelength to either a plurality of optical wavelength groups, a plurality of lower power signal groups, or a combination thereof; that are inputted to the modulators 540A-540F. The modulators 540A-540F receive electric signals from the plurality of output ports 510. The modulators 540A-540F encode the electric signals to the plurality of optical wavelength groups, the plurality of lower power signal groups, or the combination thereof. The modulators 540A-540F propagate the plurality of encoded optical wavelengths through light propagation mediums 550A-550F. The light propagation mediums 550A-550F propagate the encoded optical wavelengths from the modulators 540A-540F of the transmitter side, to the DEMUX 560A-560F of the receiver side. The DEXUM 560A-560F split each optical wavelength from the encoded optical wavelengths, and send them to the photodetectors 570A-570F. The photodetectors 570A-570F decode the electrical signals from the encoded optical wavelengths and send them to the appropriate input port 580A-580F from the plurality of input ports 580.

Figure 6:
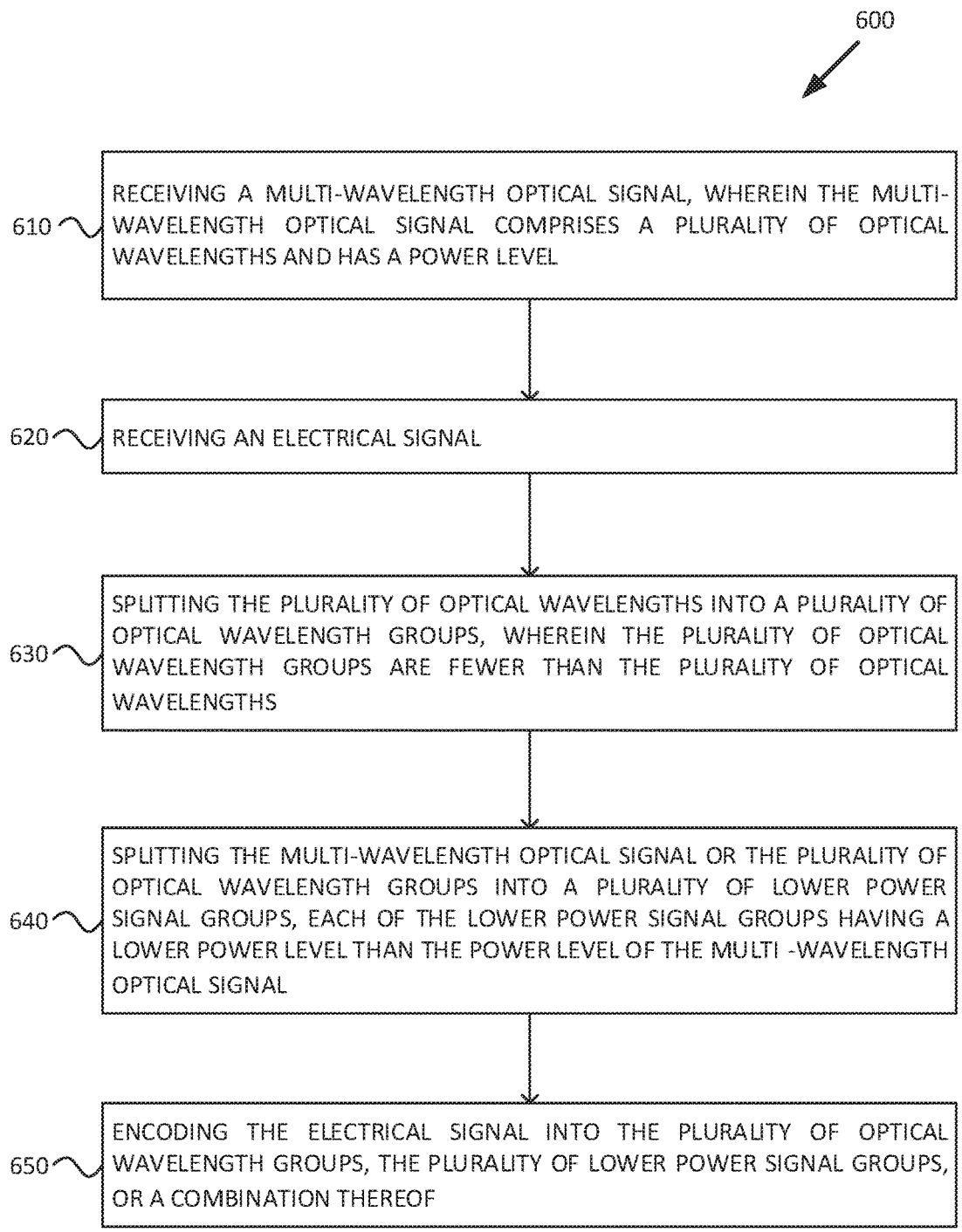
FIG. 6 is a flowchart of an example method for splitting a multi-wavelength optical signal.

FIG. 6 is a flowchart of an example method for splitting a multi-wavelength optical signal. Method 600 may be implemented, for example, by system 100 from FIG. 1. Method 600 may also be implemented by system 500 from FIG. 5. Method 600, as well as the method described herein can, for example, be implemented in the form of machine readable instructions stored in a memory of a computing system (e.g., implementation of instructions 741-745 of system 700 from FIG. 7), in the form of electronic circuitry or another suitable form. The method 600 comprises a plurality of blocks (e.g., blocks 610-650) to be performed.

In a first example, the method 600 may be executed by the data transmitting mechanism between the transmitter side of a first networking switch and the receiver side of a second networking switch.

In a second example, the method 600 may be executed by the data transmitting mechanism between a processing unit (e.g., central processing unit (CPU), system on a chip (SoC)) and a memory unit.

At block 610, the system (e.g., system 100 from FIG. 1) receives a multi-wavelength optical signal (e.g., multi-wavelength optical signal 110 from FIG. 1), wherein the multi-wavelength optical signal comprises a plurality of optical wavelengths (e.g., $\lambda 1$-$\lambda 8$ 210A from FIG. 2A) and has a power level. In an example, the multi-wavelength optical signal may be outputted by a comb laser. In another example, the multi-wavelength optical signal may be outputted by an array of hybrid micro-ring lasers.

At block 620, the system receives an electrical signal (e.g., electrical signal 130 from FIG. 3). The electrical signal may be received by a modulator (e.g., modulator 130 from FIG. 1). The electrical signal may be outputted by an electronic output port (e.g., electronic out port OPA 510A-OPF 510F from FIG. 5).

At block 630, the system splits the plurality of optical wavelengths into a plurality of optical wavelength groups (e.g., optical wavelengths 204A and 250A from FIG. 2A), wherein the plurality of optical wavelength groups are fewer than the plurality of optical wavelengths. Block 630 may be performed by the first splitter 120 from FIG. 1. In an example, block 630 may be performed by a ring resonator-based wavelength splitter (e.g., ring resonator-based wavelength splitter 200A from FIG. 2A. In another example of the present disclosure, block 630 may be performed by an AWG splitter (e.g., AWG splitter 300 from FIG. 3). As a third example, block 630 may be performed in a way that the splitter splits the plurality of optical wavelengths into a plurality of optical wavelength groups, wherein each optical wavelength group comprises a single optical wavelength.

At block 640, the system splits the multi-wavelength optical signal or the plurality of optical wavelength groups into a plurality of lower power signal groups (e.g., lower power signal groups 430A and 440A from FIG. 4A), each of the lower power signal groups having a lower power level than the power level of the multi-wavelength optical signal. Block 640 may be performed by the second splitter 125 from FIG. 1. In a first example, block 640 may be performed by a Y branch splitter (e.g., Y branch splitter 400A from FIG. 4A). In a second example, block 640 may be performed by a MMI splitter (e.g., MMI 400B from FIG. 4B). In a third example, block 640 may be performed by a directional coupler splitter (e.g., directional coupler splitter 400C from FIG. 4C).

At block 650, the system encodes the electrical signal into the plurality of optical wavelength groups, the plurality of lower power signal groups, or a combination thereof. Block 650 may be performed by the modulator 140 from FIG. 1.

Figure 7:
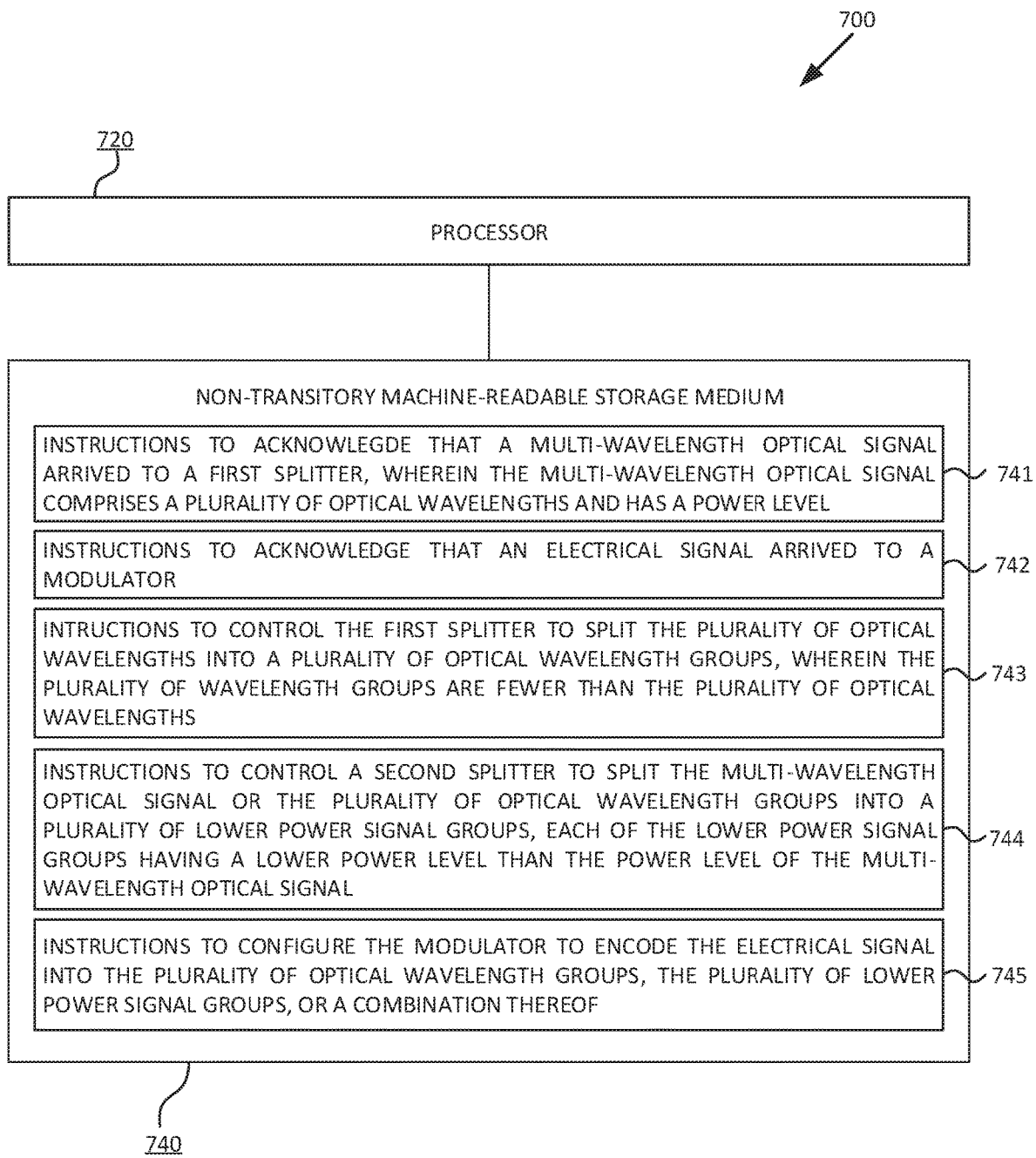
FIG. 7 is a block diagram illustrating a system to split a multi-wavelength optical signal.

FIG. 7 is a block diagram illustrating an example of a computing system to sequence host I/O requests and I/O snapshots. FIG. 7 describes a system 700 that includes a physical processor 720 and a non-transitory machine-readable storage medium 740. The processor 720 may be a microcontroller, a microprocessor, a central processing unit (CPU) core, an application-specific-integrated circuit (ASIC), a field programmable gate array (FPGA), and/or the like. The machine-readable storage medium 740 may store or be encoded with instructions 741-745 that may be executed by the processor 720 to perform the functionality described herein. System 700 hardware may be the same or similar as the hardware in system 100 of FIG. 1. System 700 may use the method 600 of FIG. 6.

In an example, the instructions 741-745, and/or other instructions can be part of an installation package that can be executed by the processor 720 to implement the functionality described herein. In such case, non-transitory machine readable storage medium 740 may be a portable medium such as a CD, DVD, or flash device or a memory maintained by a computing device from which the installation package can be downloaded and installed. In another example, the program instructions may be part of an application or applications already installed in the non-transitory machine-readable storage medium 740.

The non-transitory machine readable storage medium 740 may be an electronic, magnetic, optical, or other physical storage device that contains or stores executable data accessible to the system 700. Thus, non-transitory machine readable storage medium 740 may be, for example, a Random Access Memory (RAM), an Electrically Erasable Programmable Read-Only Memory (EEPROM), a storage device, an optical disk, and the like. The non-transitory machine readable storage medium 740 does not encompass transitory propagating signals. Non-transitory machine readable storage medium 740 may be allocated in the system 700 and/or in any other device in communication with system 700.

In the example of FIG. 7, the instructions 741, when executed by the processor 720, cause the processor 720 to acknowledge that a multi-wavelength optical signal (e.g., multi-wavelength optical signal 110 from FIG. 1) arrived to a first splitter (e.g., ring resonator-based wavelength splitter 200A from FIG. 2A, AWG splitter 300 from FIG. 3), wherein the multi-wavelength optical signal comprises a plurality of optical wavelengths and has a power level.

The system 700 may further include instructions 742 that, when executed by the processor 720, cause the processor 720 to acknowledge that an electrical signal (e.g., electrical signal 130 from FIG. 1) arrived to a modulator (e.g., modulator 130 from FIG. 1).

The system 700 may further include instructions 743 that, when executed by the processor 720, cause the processor 720 to control the first splitter to split the plurality of optical wavelengths into a plurality of optical wavelength groups, wherein the plurality of wavelength groups are fewer than the plurality of optical wavelengths.

The system 700 may further include instructions 744 that, when executed by the processor 720, cause the processor 720 to control a second splitter (e.g., Y branch splitter 400A from FIG. 4A, MMI splitter 400B from FIG. 4B, directional coupler 400C from FIG. 4C) to split the multi-wavelength optical signal or the plurality of optical wavelength groups into a plurality of lower power signal groups, each of the lower power signal groups having a lower power level than the power level of the multi-wavelength optical signal.

The system 700 may further include instructions 745 that, when executed by the processor 720, cause the processor 720 to configure the modulator to encode the electrical signal into the plurality of optical wavelength groups, the plurality of lower power signal groups, or a combination thereof.

The above examples may be implemented by hardware or software in combination with hardware. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A system to receive a multi-wavelength optical signal and an electrical signal, wherein the multi-wavelength optical signal comprises a plurality of optical wavelengths and has a power level, the system comprising:
   a first splitter to split the plurality of optical wavelengths into a plurality of optical wavelength groups, wherein the plurality of optical wavelength groups are fewer than the plurality of optical wavelengths;
   a second splitter to split the multi-wavelength optical signal or the plurality of optical wavelength groups into a plurality of lower power signal groups, each of the lower power signal groups having a lower power level than the power level of the multi-wavelength optical signals; and
   a modulator to encode the electrical signal into the plurality of optical wavelength groups, the plurality of lower power signal groups, or a combination thereof;
   wherein each of the plurality of optical wavelength groups split by the first splitter are transmitted as separate signals on a transmitter side corresponding to a first networking switch, each of the plurality of lower power signal groups split by the second splitter are transmitted as separate signals on the transmitter side corresponding to the first networking switch, or the combination thereof is transmitted as separate signals on the transmitter side corresponding to the first networking switch, and wherein each of the transmitted separate signals are received via a respective optical fiber connected to a respective receiving mechanism of a receiver side corresponding to a second networking switch, and further wherein the receiving mechanism comprises an optical demultiplexer (DEMUX).

2. The system of claim 1, wherein the first splitter comprises a ring resonator-based wavelength splitter to split the plurality of optical wavelengths into the plurality of optical wavelength groups.

3. The system of claim 1, wherein the first splitter comprises an array waveguide grating (AWG) to spot the plurality of optical wavelengths into the plurality of optical wavelength groups.

4. The system of claim 1, wherein the second splitter comprises at least one of a Y branch splitter, a multi-mode interferometer (MMI), or a directional coupler to split the multi-wavelength optical signal into the plurality of lower power signal groups.

5. The system of claim 1, wherein the first splitter comprises a plurality of splitters connected in cascade.

6. The system of claim 1, wherein the second splitter comprises a plurality of splitters connected in cascade.

7. The system of claim 1, wherein the first splitter splits the plurality of optical wavelengths into plurality of optical wavelength groups by increasing a channel space between any consecutive optical wavelengths in an optical wavelength group.

8. The system of claim 1, wherein an optical wavelength group from the plurality of optical wavelength groups comprises a plurality of optical wavelengths, the optical demultiplexer (DEMUX) to split each optical wavelength from the optical wavelength group.

9. The system of claim 1, further comprising a comb laser that outputs the multi-wavelength optical signal.

10. The system of claim 1, further comprising an array of hybrid micro-ring lasers to output the multi-wavelength optical signal.

11. The system of claim 1, further comprising an electronic output port to output the electric signal.

12. The system of claim 1 being part of a data transmitting mechanism between the transmitter side of the first networking switch and the receiver side of the second networking switch.

13. The system of claim 1 being part of a data transmitting mechanism between a processing unit and a memory unit.

* * * * *